US011003931B2

(12) United States Patent
Wang et al.

(10) Patent No.: US 11,003,931 B2
(45) Date of Patent: May 11, 2021

(54) VEHICLE MONITORING METHOD AND APPARATUS, PROCESSOR, AND IMAGE ACQUISITION DEVICE

(71) Applicant: Hangzhou Hikvision Digital Technology Co., Ltd., Zhejiang (CN)

(72) Inventors: Qun Wang, Zhejiang (CN); Jun Chen, Zhejiang (CN); Jinhong Qi, Zhejiang (CN); Binghua Luo, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 397 days.

(21) Appl. No.: 15/749,860

(22) PCT Filed: May 25, 2016

(86) PCT No.: PCT/CN2016/083326
§ 371 (c)(1),
(2) Date: May 18, 2018

(87) PCT Pub. No.: WO2017/028587
PCT Pub. Date: Feb. 23, 2017

(65) Prior Publication Data
US 2018/0232587 A1    Aug. 16, 2018

(30) Foreign Application Priority Data

Aug. 14, 2015  (CN) .......................... 201510501619.5

(51) Int. Cl.
*G06K 9/00* (2006.01)
*G06K 9/36* (2006.01)

(52) U.S. Cl.
CPC ..... *G06K 9/00845* (2013.01); *G06K 9/00268* (2013.01); *G06K 9/00523* (2013.01);
(Continued)

(58) Field of Classification Search
CPC ........... G06K 9/00832; G06K 9/00845; G06K 9/00268; G06K 9/00523; G06K 9/00597;
(Continued)

(56) References Cited

U.S. PATENT DOCUMENTS

2003/0021488 A1*  1/2003  Shaw ...................... G06T 5/008
                                                            382/260
2010/0130182 A1    5/2010  Rosen
(Continued)

FOREIGN PATENT DOCUMENTS

CN          101197942         6/2008
CN          101246648 A  *    8/2008
(Continued)

OTHER PUBLICATIONS

Machine Translation of CN 101246648 A published on Aug. 20, 2008 (Year: 2008).*
(Continued)

*Primary Examiner* — Nay A Maung
*Assistant Examiner* — Jose M Torres
(74) *Attorney, Agent, or Firm* — Mark E. Bandy; Rankin, Hill & Clark LLP

(57) ABSTRACT

The present application discloses a vehicle monitoring method and apparatus, processor, and image acquisition device. The method includes: identifying a vehicle window area image in a vehicle image obtained through monitoring; performing feature identification on the vehicle window area image to obtain an identification result of a target feature; performing human eye sensory processing on the vehicle image and the vehicle window area image respectively, and stitching the processed vehicle image and the processed vehicle window area image to obtain a processed image; and outputting the identification result of the target feature and the processed image. The present application solves the
(Continued)

technical problem of relatively low identification rate in vehicle monitoring by image detection.

18 Claims, 8 Drawing Sheets

(52) U.S. Cl.
CPC ..... G06K 9/00597 (2013.01); G06K 9/00771 (2013.01); G06K 9/36 (2013.01); *G06K 2209/15* (2013.01); *G06K 2209/23* (2013.01)

(58) Field of Classification Search
CPC .... G06K 9/00771; G06K 9/3241; G06K 9/36; G06K 2209/15; G08G 1/017; G08G 1/052; G08G 1/054; G08G 1/04
See application file for complete search history.

(56) References Cited

U.S. PATENT DOCUMENTS

| | | | | |
|---|---|---|---|---|
| 2013/0051625 A1* | 2/2013 | Fan | ................ | G06K 9/00234 |
| | | | | 382/104 |
| 2013/0336538 A1* | 12/2013 | Skaff | ................ | G06K 9/00785 |
| | | | | 382/104 |
| 2014/0301597 A1* | 10/2014 | Xu | ................ | G06K 9/00832 |
| | | | | 382/103 |
| 2015/0097952 A1 | 4/2015 | Eschbach et al. | | |
| 2015/0286883 A1* | 10/2015 | Xu | ................ | G06K 9/00228 |
| | | | | 382/103 |
| 2016/0078306 A1* | 3/2016 | Artan | ................ | G06K 9/00838 |
| | | | | 382/104 |

FOREIGN PATENT DOCUMENTS

| | | |
|---|---|---|
| CN | 100590675 | 2/2010 |
| CN | 104573680 | 4/2015 |
| CN | 104680156 | 6/2015 |
| CN | 104700066 | 6/2015 |
| KR | 20150045235 | 4/2015 |

OTHER PUBLICATIONS

Extended European Search Report dated Mar. 13, 201; App. No. EP16836451.1; 10 pages.

"A comparative study on illumination preprocessing in face recognition"; Hu Han et al; Pattern Recognition 46 (2013) 1691-1699; 9 pages.

"Uncivilized Driving Behavior in Street Photographs: See Who's Not Wearing Seatbelt"; Internet Info Agency-Motoring; Feb. 20, 2013; http://auto.news18a.com/news/20130220/story_309888.html; 5 pages.

* cited by examiner

VEHICLE MONITORING METHOD AND APPARATUS, PROCESSOR, AND IMAGE ACQUISITION DEVICE

The present application claims the priority to a Chinese patent application No. 20150501619.5 filed with the State Intellectual Property Office of People's Republic of China on Aug. 14, 2015 and entitled "VEHICLE MONITORING METHOD AND APPARATUS, PROCESSOR, AND IMAGE ACQUISITION DEVICE", which is incorporated herein by reference in its entirety.

TECHNICAL FIELD

The present application relates to the field of monitoring, and specifically, a vehicle monitoring method and apparatus, processor, and image acquisition device.

BACKGROUND

Currently, high-definition checkpoint systems are provided with a high-definition webcam (also be referred as "snapshot machine"), which may snapshot an image and is provided with pattern identification technologies such as detecting of the driver's human face, seatbelt detection, and sun-shading board detection. For a user, it is required that the image shot by the snapshot machine is clear and easy to be identified so as to facilitate providing data support for the maintenance of public safety, crime detection, investigation, and searching for clues after time business events such as fleeing from the scene of an accident.

Based on the above business requirement, the snapshot machine generally will select a area of interest in the shot vehicle image for image processing or feature identification. In the prior art, the accuracy of image processing is inadequate. Moreover, during the image processing, the effect of factors such as the vehicle model of the vehicle that is monitored and preliminary image processing on the result of the feature identification. As a result, its result of feature identification or image processing is not ideal. There exists a problem of relatively low rate of image detection identification of the vehicle that is monitored.

Currently, no effective solution has been proposed for the above described problem.

SUMMARY

Embodiments of the present application provide a vehicle monitoring method and apparatus, processor, and image acquisition device, in order to solve at least the technical problem of relatively low rate of image detection identification of the vehicle that is monitored.

According to one aspect of embodiments of the present application, a vehicle monitoring method is provided, including: identifying a vehicle window area image in a vehicle image obtained through monitoring; performing feature identification on the vehicle window area image to obtain an identification result of a target feature; performing human eye sensory processing on the vehicle image and the vehicle window area image respectively, and stitching the processed vehicle image and the processed vehicle window area image to obtain a processed image; and outputting the identification result of the target feature and the processed image.

Further, performing feature identification on the vehicle window area image to obtain an identification result of a target feature includes: performing pre-processing on the vehicle window area image to obtain a pre-processed image; and performing the feature identification on the pre-processed image to obtain the identification result of the target feature.

Further, after performing feature identification on the vehicle window area image to obtain an identification result of a target feature, the method further includes: saving image parameters of the identified pre-processed image, wherein, the image parameters include: a contrast ratio of the foreground and the background of the pre-processed image and/or a grayscale value of the pre-processed image; using the identification result, confidence of the identification result and the image parameters as feedback parameters; using the feedback parameters to adjust pre-processing parameters for the pre-processing performed on the vehicle window area image to obtain adjusted pre-processing parameters; and using the adjusted pre-processing parameters to perform pre-processing on the current vehicle window area image and/or the next vehicle window area image, wherein, the pre-processing includes at least one of contrast enhancement, curve correction, sharpening, and noise reduction.

Further, performing feature identification on the vehicle window area image to obtain an identification result of a target feature includes: identifying a human facial feature of the driver of the vehicle in the vehicle window area image; and identifying whether there is a driving status feature in the vehicle window area image to obtain a status identification result, wherein, the driving status feature includes at least one of a feature indicating that the driver is making a phone call, a feature indicating that the sun-shading board of the vehicle is unfolded, and a feature indicating that the driver is wearing the seatbelt, and wherein, the identification result includes the human facial feature of the driver and the status identification result.

Further, performing human eye sensory processing on the vehicle image and the vehicle window area image respectively includes: performing highlight and/or shadow adjustment on the vehicle image to obtain the processed vehicle image; and, adjusting the contrast coefficient of each pixel point in the vehicle window area image to obtain the processed vehicle window area image.

Further, stitching the processed vehicle image and the processed vehicle window area image to obtain a processed image includes: stitching any one edge of the processed vehicle image and one edge of the processed vehicle window area image to obtain the processed image; or, replacing the vehicle window portion in the processed vehicle image with the processed vehicle window area image to obtain the processed image.

According to another aspect of embodiments of the present application, a vehicle monitoring apparatus is further provided, including: an image identification module, configured for identifying a vehicle window area image in a vehicle image obtained through monitoring; a feature identification module, configured for performing feature identification on the vehicle window area image to obtain an identification result of a target feature; an image processing module, configured for performing human eye sensory processing on the vehicle image and the vehicle window area image respectively, and stitching the processed vehicle image and the processed vehicle window area image to obtain a processed image; and an outputting module, configured for outputting the identification result of the target feature and the processed image.

Further, the feature identification module includes: a first image processing sub-module, configured for performing pre-processing on the vehicle window area image to obtain a pre-processed image; and a first feature identification sub-module, configured for performing the feature identification on the pre-processed image to obtain the identification result of the target feature.

Further, the vehicle monitoring apparatus further includes: a saving module, configured for saving image parameters of the identified pre-processed image, wherein, the image parameters include: a contrast ratio of the foreground and the background of the pre-processed image and/or a grayscale value of the pre-processed image; a first processing module, configured for using the identification result, confidence of the identification result and the image parameters as feedback parameters; a second processing module, configured for using the feedback parameters to adjust pre-processing parameters for the pre-processing performed on the vehicle window area image to obtain adjusted pre-processing parameters; and; a third processing module, configured for using the adjusted pre-processing parameters to perform pre-processing on the current vehicle window area image and/or the next vehicle window area image, wherein, the pre-processing includes at least one of contrast enhancement, curve correction, sharpening, and noise reduction.

Further, the feature identification module further includes: a second feature identification sub-module, configured for identifying a human facial feature of the driver of the vehicle in the vehicle window area image; and a third feature identification sub-module, configured for identifying whether there is a driving status feature in the vehicle window area image to obtain a status identification result, wherein, the driving status feature include at least one of a feature indicating that the driver is making a phone call, a feature indicating that the sun-shading board of the vehicle is unfolded, and a feature indicating that the driver is wearing the seatbelt, and wherein, the identification result includes the human facial feature of the driver and the status identification result.

Further, the image processing module includes: a first adjusting sub-module, configured for performing highlight and/or shadow adjustment on the vehicle image to obtain the processed vehicle image; and, a second adjusting sub-module, configured for adjusting the contrast coefficient of each pixel point in the vehicle window area image to obtain the processed vehicle window area image.

Further, the image processing module further includes: a stitching module, configured for stitching any one edge of the processed vehicle image and one edge of the processed vehicle window area image to obtain the processed image; or, a replacing module; configured for replacing the vehicle window portion in the processed vehicle image with the processed vehicle window area image to obtain the processed image.

According to another aspect of embodiments of the present application, a processor is further provided, including the above described vehicle monitoring apparatus having any one of the above described features.

According to another aspect of embodiments of the present application, an image acquisition device is further provided, including: an image acquisition unit, configured for acquiring a vehicle image of a vehicle when the vehicle enters into a predetermined location; and the above described processor having the above described feature, which is connected with the image acquisition unit and configured for identifying a vehicle window area image in the vehicle image; performing feature identification on the vehicle window area image to obtain an identification result of a target feature; performing human eye sensory processing on the vehicle image and the vehicle window area image respectively, and stitching the processed vehicle image and the processed vehicle window area image to obtain a processed image; and, outputting the identification result of the target feature and the processed image.

Further, the image acquisition unit includes: an imaging sensor, configured for capturing an image of the vehicle when the vehicle enters into a predetermined location; and; a data converter, which is connected with the imaging sensor and the processing device respectively, and configured for converting the image into a vehicle image with a YUV data format and inputting the vehicle image to the processing device.

According to another aspect of embodiments of the present application, an application program is further provided, which is configured for carrying out the above described vehicle monitoring method when being executed.

According to another aspect of embodiments of the present application, a storage medium is further provided, which is used for storing an application program configured for carrying out the above described vehicle monitoring method.

In embodiments of the present application, by identifying a vehicle window area image in a vehicle image obtained through monitoring, performing feature identification on the vehicle window area image to obtain an identification result of a target feature, performing human eye sensory processing on the vehicle image and the vehicle window area image respectively, and then stitching the processed vehicle image and the processed vehicle window area image to obtain a processed image, and ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

BRIEF DESCRIPTION OF THE DRAWINGS

The drawings described here are used to provide further understanding of the present application, and constitute part of the present application. The illustrative embodiments of the present application and their description are used to explain the present application, and do not constitute undue limitation on the present application. In the drawings.

DESCRIPTION OF THE EMBODIMENTS

To enable those skilled in the art to understand the solution of the present application better, the technical solution in embodiments of the present application will be described in detail and fully by reference to the accompanying drawings in embodiments of the present application. Evidently, the embodiments described are merely some of the embodiments of the present application, and not all of the embodiments. All other embodiments obtained by those skilled in the art based on the embodiments in the present application without creative labor should all fall within the scope of protection of the present application.

It should be noted that, in the specification, claims and the above described drawings of the present application, terms such as "first," "second" and the like are used to distinguish similar objects, and are not necessarily used to describe any specific order or ordered sequence. It should be understood that data used in this way are interchangeable in appropriate context so that the embodiments of the present application described here can be implemented in an order other than those illustrated or described. Moreover, the terms "include," "contain" or any other variants thereof are intended to cover a non-exclusive inclusion. For example, processes, methods, systems, products, or devices including a series of steps or units are not limited to those steps or units specified, but can include other steps or units not specified or inherent to those processes, methods, systems, products, or devices.

Embodiment 1

An embodiment of a vehicle monitoring method is provided according to embodiments of the present application. It should be noted that the steps shown in the flow charts of the drawings can be executed in a computer system of a set of computer executable instructions. Moreover, although a logical order is shown in the flow charts, in certain situations the steps illustrated or described can be executed in an order other than that here.

Figure 1:
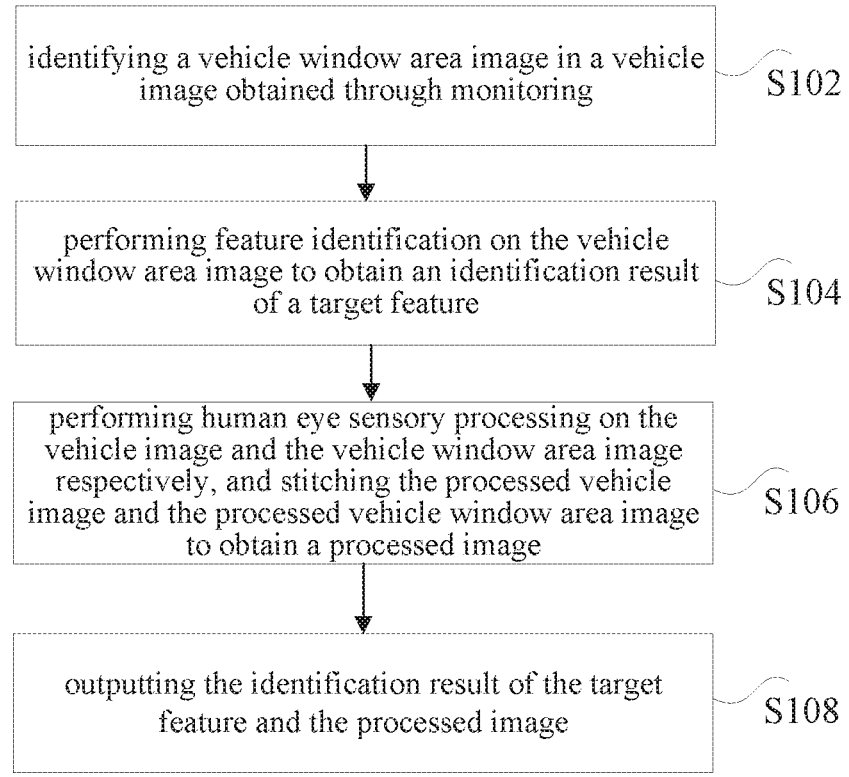
FIG. 1 is a flow chart of an optional vehicle monitoring method according to an embodiment of the present application.

FIG. 1 is a vehicle monitoring method according to an embodiment of the present application. As shown in FIG. 1, the method includes the following steps:

step S102, identifying a vehicle window area image in a vehicle image obtained through monitoring;

step S104, performing feature identification on the vehicle window area image to obtain an identification result of a target feature;

step S106, performing human eye sensory processing on the vehicle image and the vehicle window area image respectively, and stitching the processed vehicle image and the processed vehicle window area image to obtain a processed image; and step S108, outputting the identification result of the target feature and the processed image.

In embodiments of the present application, by identifying a vehicle window area image in a vehicle image obtained through monitoring, performing feature identification on the vehicle window area image to obtain an identification result of a target feature, performing human eye sensory processing on the vehicle image and the vehicle window area image respectively, and then stitching the processed vehicle image and the processed vehicle window area image to obtain a processed image, and ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

Optionally, when outputting the identification result of the target feature and the processed image, the identification result of the target feature and the processed image may be output synchronously.

Optionally, a vehicle image obtained through monitoring is an image involving the vehicle and its surround environment. The location to be monitored can be a cross-section or highway section in public roads, and can also be locations that have needs for vehicle monitoring, such as the underground parking area of a community and a public parking area. The status of the monitored vehicle in the vehicle image can be a driving status or a parking status. If the vehicle is in the driving status, the effect of the driving speed of the vehicle on the monitoring imaging is not limited here. If the vehicle is in a nighttime environment, the effect of nighttime lighting on the monitoring imaging is also not limited here.

In the above described embodiment of the present application, vehicle images of passing vehicles can be monitored by a high-definition checkpoint or a high-definition public safety checkpoint. The high-definition checkpoints monitors the vehicle lanes and the non-vehicle lanes of the road section to be monitored in all-weather real time with technologies such as advanced photoelectric technologies, computers, image processing, mode identification, and remote data access, and the relevant image data (i.e. the vehicle image in the embodiment) are recorded. After the vehicle image has been acquired, the shot vehicle image can be analyzed by a front-end processing system (e.g., a processor) to obtain from the vehicle image automatically data such as the passing time, location, driving direction, license plate number, license plate color, and vehicle body color of the vehicle, and the obtained information may be transmitted to a database of a high-definition checkpoint system control center via a computer network for processing such as data storing, querying, and comparison. When hit-and-run accidents or offences occur, or a suspicious vehicle is found, the system will automatically send an alarm signal to an interception system and relevant personnel.

The high-definition public safety checkpoint is directed to the maintenance of public safety, which acquires an image of the vehicle and the features of the driver and passer on the front seats for every vehicle that passes on a road, and automatically identifies the license plate of the vehicle, with advanced photoelectric technologies, image processing technologies, and mode identification technologies. By using high-definition public safety checkpoint systems for vehicle safety, accident-causing vehicles, peccancy vehicles, or vehicles in a black list can be very quickly captured, and the composition, traffic distribution, and violation of regulations of vehicles running on public roads are automatically recorded incessantly.

Optionally, the vehicle window area image is directed to a windshield area that can be identified in the vehicle image, for example, the windshield of the left and right vehicle windows of the front seats, the windshield of the left and right vehicle windows of the back seats, the windshield at the tail of the vehicle, and the windshield at the head of the vehicle. To obtain more target features and a vehicle window area image with more worthy of processing, in the present embodiment, images for the windshield at the head of the vehicle or the windshield of the left vehicle window of the front seats are selected as the vehicle window area image to be processed.

Optionally, the target feature can be, but is not limited to, one of: a vehicle license plate, a seatbelt, a sun-shading board, the face of the driver, and the driver's gesture of making a phone call. Based on different monitoring needs, the target feature can also be other identifiable features of the vehicle, the driver, or the driver's behavior.

A sun-shading board is a board at the front windshield and back windshield of a vehicle. It is designed to avoid glaring the eye due to the sunlight, and can be moved back and forth to block the sunlight so as to prevent traffic accidents.

Optionally, the human eye sensory processing in the present embodiment should be understood as: after a complete processing of the vehicle image, the obtained image processing result is suitable for sensory identification by a human eye. For example, the human eye is defined in the biology field as being capable of sensing light change within 30 Hz, at 100 times per second. Based on the biological property of the human eye, the vehicle image processed is easier to be identified by the human eye.

Figure 2:
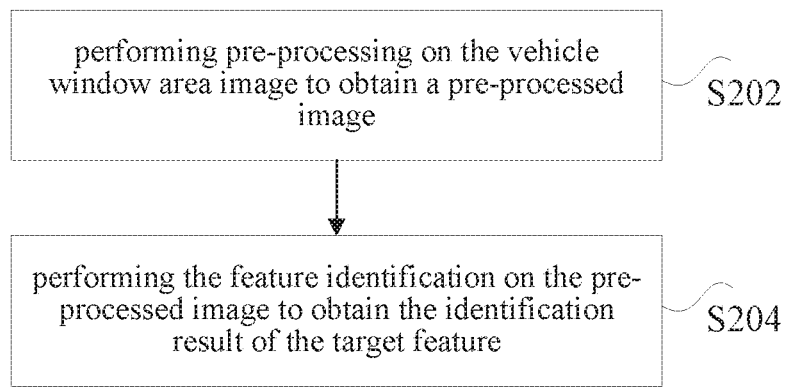
FIG. 2 is a flow chart of another optional vehicle monitoring method according to an embodiment of the present application.

Optionally, FIG. 2 is a flow chart of another optional vehicle monitoring method according to an embodiment of the present application. As shown in FIG. 2, the method includes the following steps:

step S202, performing pre-processing on the vehicle window area image to obtain a pre-processed image;

step S204, performing the feature identification on the pre-processed image to obtain the identification result of the target feature.

The above described steps S202 and S204 are one realization mode of step S104 in the embodiment.

Optionally, the method of performing pre-processing on the vehicle window area image can be: performing vehicle window detection on the YUV data (Y, U, and V represent, respectively, a pixel component) of the vehicle image inputted to obtain a rectangular vehicle window area, saving the YUV data corresponding to the rectangular vehicle window area, and performing in the following way image processing on the YUV data of the rectangular vehicle window area saved: automatic contrast enhancing, Gamma curve processing, USM (Unsharp Mask) sharpening, and processing by a noise-reduction module. Ultimately, the pre-processed image is obtained. USM sharpening is a tool in drawing software used for quickly focusing blurred boundaries of an image; Gamma curve processing is an image processing method of correcting the brightness deviation of an image in a monitor.

Optionally, the identification result can be information perceived and understood by an ordinary operator of a monitoring device in a broad sense. The identification result can be displayed on a human-machine interface of an output device as a feature such as a value, a text, a symbol, or a color. For example, a sedan is monitored, and a vehicle image and a vehicle window area image are captured. After the image processing and feature identification in the embodiment described above, the identification result outputted by an output device is a text string, part of which can be "License Plate No.: Jing KD3457; Driver not using a cellphone; Driver not having seatbelt on."

Optionally, the identification result can also include other vehicle information, such as the type of the vehicle or the color of the vehicle. Here, the performing feature identification on the pre-processed image to obtain the identification result of the target feature in the embodiment is further described in detail in the case of using the type of the vehicle as vehicle information.

Optionally, the type of the vehicle is identified in the vehicle image. Based on the type of the vehicle, a vehicle window area in the vehicle image is located, and the vehicle window area image corresponding to the vehicle window area is identified. Specifically, a target region image can be determined based on vehicle position information in the vehicle image, wherein, the target region image is an image in the direction of the vehicle's principal view; contour features and texture features of the vehicle in the target region image are extracted; and, the type of the vehicle is obtained by identifying the contour features and texture features using a classifier.

Specifically, an area of interest at the front of the vehicle is set based on vehicle detection position information, and when the texture features of the vehicle's contour are extracted, the type of the vehicle can be obtained by sending the texture features of the vehicle's contour to a classifier for training and predicting. For example, the type of the vehicle in the vehicle image is identified based on vehicle appearance features. Generally, the appearance features of vehicles such as trucks, sedans, and passenger cars are different. Thus, the types of the vehicle corresponding to vehicles such as trucks, sedans, and passenger cars in the embodiment are different. Further, the locations of a vehicle window area in vehicles of different type are also different based on the appearance design and specific configuration of vehicles of different types. For example, the locations of a vehicle window area having the driver's features are different in an ordinary sedan and a double-deck bus. Therefore, a vehicle window area in the vehicle image can be located based on the type of the vehicle, and the vehicle window area image corresponding to the vehicle window area can be identified. Specifically, vehicle window detection is performed on the YUV data of the vehicle image inputted, a rectangular vehicle window area is carved out, and the YUV data corresponding to the rectangular vehicle window area is saved. YUV (Y, U, and V represent, respectively, a pixel component) is a color encoding format, mainly refers to the pixel format with the luminance component and the chrominance components expressed separately, and is used for optimizing the transmission of color video signals.

Optionally, the method of performing feature identification on the pre-processed image can be: sending the pre-processed image, i.e., the YUV data of the rectangular vehicle window area after the image processing, to an assembly for identifying a target feature in a vehicle window area of a vehicle license plate identification algorithm, a seatbelt detection algorithm, a human face locating detection algorithm, a sun-shading board detection algorithm, and a cellphone-using detecting algorithm, and outputting and saving the identification result of each target feature.

Figure 3:
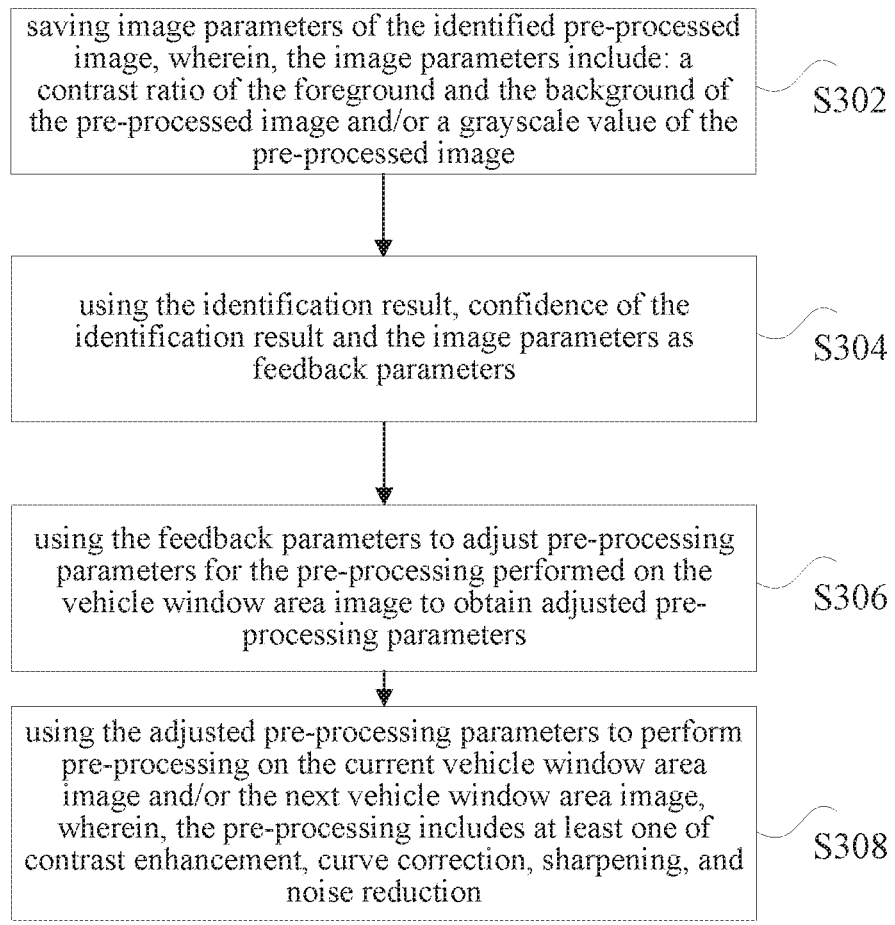
FIG. 3 is a flow chart of a third optional vehicle monitoring method according to an embodiment of the present application.

Optionally, FIG. 3 is a flow chart of a third optional vehicle monitoring method according to an embodiment of the present application. As shown in FIG. 3, the method includes the following steps:

step S302, saving image parameters of the identified pre-processed image, wherein, the image parameters include: a contrast ratio of the foreground and the background of the pre-processed image and/or a grayscale value of the pre-processed image;

step S304, using the identification result, confidence of the identification result and the image parameters as feedback parameters;

step 306, using the feedback parameters to adjust pre-processing parameters for the pre-processing performed on the vehicle window area image to obtain adjusted pre-processing parameters; and step S308, using the adjusted pre-processing parameters to perform pre-processing on the current vehicle window area image and/or the next vehicle window area image, wherein, the pre-processing includes at least one of contrast enhancement, curve correction, sharpening, and noise reduction.

In the present embodiment, after S204 is executed, S302, S304, S306 and S308 are executed.

In the present embodiment, the image parameters of the pre-processed image identified are saved. The image parameters can be the contrast ratio of the foreground and the background of the pre-processed image, or the grayscale value of the pre-processed image, or can include both. By saving a large amount of image parameters and performing statistical analysis, the image processing strategy can be adjusted and perfected. The confidence of the identification result can be obtained by performing statistical analysis on identification error rate or accuracy rate in a large amount of image identification samples Here, an image identification sample can be the vehicle image.

Optionally, using the confidence of the identification result includes: obtaining the confidence of the identification result by performing statistical analysis on the identification result, wherein, the method for performing statistical analysis on the identification result includes: determining whether each identification result (such as the identification result of a feature of the driver making a call, the identification result of a feature of unfolding a sun-shading board of the vehicle, and the identification result of a feature of the driver having the seatbelt on) is accurate; counting the number of accurate identification results to obtain the accuracy rate of the identification result, and determining the confidence of the accuracy rate.

The identification result can be provided in the form of yes/no. For example, if a feature of the driver's making a call is present in the image, and the identification result is yes, then the identification result is accurate; if the identification result is no, then the identification result is inaccurate.

Optionally, the identification results can be labeled based on the determined result. If an identification result is accurate, its determined result is labeled 1. If an identification result is inaccurate, its determined result is labeled 0. The determined results of the identification results are then added together to obtain the number of accurate identification results, and the ration between the number of accurate identification results and the total number of identification results is calculated to obtain the accuracy rate.

Optionally, a confidence is generally used to indicate a probability assurance that the error between a sampled index and the total index does not exceed a certain range. Specifically, in the embodiment, the confidence is used to indicate a probability assurance that the error between the identification result and a pre-stored historic identification result does not a certain range. Therefore, the confidence can be used to evaluate the accuracy of the identification result. Thus, by using the confidence as a feedback parameter, the result of adjusting pre-processing parameters can be more reliable.

Optionally, performing feature identification on the vehicle window area image to obtain the identification result of a target feature includes: identifying a human facial feature of the driver of the vehicle in the vehicle window area image; identifying whether there is a driving status feature in the vehicle window area image to obtain a status identification result, wherein, the driving status feature includes at least one of a feature of the driver making a phone call, a feature of unfolding the sun-shading board of the vehicle, and a feature of the driver having the seatbelt on, and wherein, the identification result includes the human facial feature of the driver and the status identification result.

After the status identification result and the human facial feature of the driver have been obtained, the identification result of the target feature is obtained.

Optionally, identifying a human facial feature of the driver of the vehicle in the vehicle window area image includes: obtaining a historic vehicle window area image imaged before the imaging time of the vehicle window area image; extracting a human facial feature of the driver in the historic vehicle window area image; obtaining a human facial feature detector by performing Haar feature (i.e., Haar-like feature, a feature description operator commonly used in the field of computer vision) calculation on the human facial feature of the driver in the historic vehicle window area image.

Optionally, by selecting and training the Haar feature of the human face of the driver in the vehicle window area image, a detector is formed, and then used to perform human face detection on the driver.

Optionally, identifying a driving status feature of the driver in the vehicle window area image to obtain a status identification result includes: obtaining a historic vehicle window area image imaged before the imaging time of the vehicle window area image; extracting a boundary feature of the sun-shading board of the vehicle in the vehicle window area image; obtaining a sun-shading board unfolding status feature detector by processing the boundary feature of the sun-shading board of the vehicle in the historic vehicle window area image; identifying the sun-shading board unfolding status feature of the vehicle in the vehicle window area image through the sun-shading board unfolding status feature detector to obtain an identification result of the sun-shading board unfolding status feature.

Optionally, by selecting and training a boundary feature of the sun-shading board in the vehicle window area image, a detector is formed, and then sun-shading board detection is performed to determine whether the sun-shading board is unfolded.

Optionally, identifying a driving status feature of the driver in the vehicle window area image to obtain a status identification result further includes: extracting position information, boundary features and texture features of the driver of the vehicle in the vehicle window area image; obtaining an identification result of the feature of the driver's making a call by using a classifier to identify the position information and boundary features; obtaining an identification result of a seatbelt status feature by using a classifier to identify the position information and the texture features.

Optionally, position information and texture features of the driver in the vehicle window area image are extracted, and sent to a classifier for training and predicting to obtain an identification result of whether the driver is wearing a seatbelt.

Optionally, position information and boundary features of the driver in the vehicle window area image are extracted, and sent to a classifier for training and predicting to obtain an identification result of whether the driver is making a call.

Optionally, the mode of performing human eye sensory processing on the vehicle image and the vehicle window area image respectively includes: performing highlight and/or shadow adjustment on the vehicle image to obtain the processed vehicle image; and, adjusting the contrast coefficient of each pixel point in the vehicle window area image to obtain the processed vehicle window area image.

Highlight and/or shadow adjustment can be performed on the WV data of the vehicle image inputted to obtain the processed vehicle image. The highlight and/or shadow adjustment can be performed in conjunction with the following processing modes: automatic contract enhancing, Gamma curve processing, USM sharpening, and processing by a noise-reduction module.

Optionally, the mode of performing human eye sensory processing on the vehicle window area image can include: performing vehicle window detection on the YUV data of the vehicle image inputted, selecting a rectangular vehicle window area, and saving the YUV data corresponding to the rectangular vehicle window area; then, adjusting the contrast factor of every pixel point in the vehicle window area image to obtain the processed vehicle window area image. The adjustment of the contrast factor can be performed in conjunction with the following processing modes: automatic contract enhancing, Gamma curve processing, USM sharpening, and processing by a noise-reduction module; then saving the YUV data of the rectangular vehicle window area after one round of image processing; further performing a second round of image processing on the YUV data of the rectangular vehicle region area, including: automatic contract enhancing, Gamma curve processing, USM sharpening, and processing by a noise-reduction module. Finally, the processed YUV data of the vehicle window area, i.e., the processed vehicle window area image, is saved.

Optionally, stitching the processed vehicle image and the processed vehicle window area image to obtain a processed image includes: stitching any one edge of the processed vehicle image and any one edge of the processed vehicle window area image to obtain the processed image; or, replacing the vehicle window portion of the processed vehicle image with the processed vehicle window area image to obtain the processed image.

Figure 4:
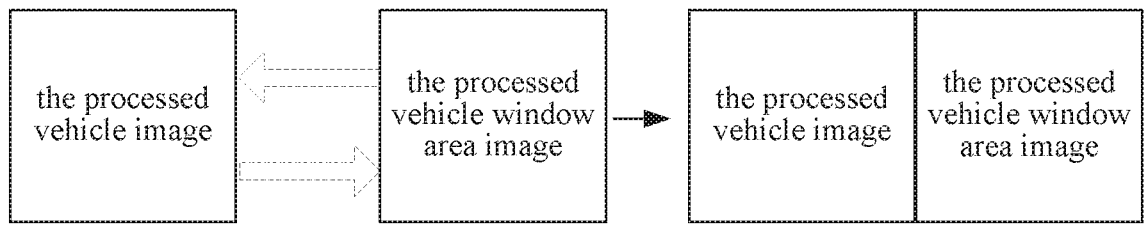
FIG. 4 is a schematic view of an optional monitoring method according to an embodiment of the present application.
Figure 5:
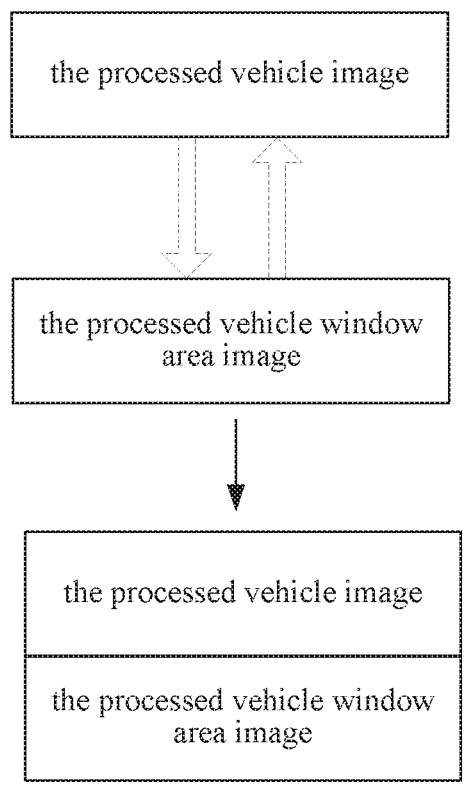
FIG. 5 is a schematic view of another optional vehicle monitoring method according to an embodiment of the present application.

Optionally, stitching the processed vehicle image and the processed vehicle window area image to obtain a processed image can be: saving and stitching the processed YUV data of the vehicle image and the processed YUV data of the vehicle window area image into one image. The processed image can meet the human eye sensory requirements, and can represent relatively well the requirement that the vehicle region be see-through and the vehicle window be locally transparent. There are multiple modes of stitching the processed vehicle image and the processed vehicle window area image. For example, any one edge of the processed vehicle image is stitched with an edge of the processed vehicle window area image to obtain the processed image. Specifically, as shown in FIG. 4, the right edge of the processed vehicle image and the left edge of the processed vehicle window area image can be stitched left-right horizontally. Or, as shown in FIG. 5, the bottom edge of the processed vehicle image and the top edge of the processed vehicle window area image can be stitched up-down vertically. Optionally, when one edge of the processed vehicle image is stitched with the processed vehicle window area image, the two edges can be stitched together completely or partially. In addition, the image of the vehicle window area portion in the processed vehicle image can be replaced by the processed vehicle window area image.

In embodiments of the present application, by identifying a vehicle window area image in a vehicle image obtained through monitoring, performing feature identification on the vehicle window area image to obtain an identification result of a target feature, performing human eye sensory processing on the vehicle image and the vehicle window area image respectively, and then stitching the processed vehicle image and the processed vehicle window area image to obtain a processed image, and ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

It should be noted that, for the different method embodiments described above, to simplify the description, they are described as a series of action sets. But those skilled in the art should know that the present application is not limited to the action order described, as according to the present application, some steps can be performed in another order or simultaneously. Second, those skilled in the art should know that the embodiments described in the specification are all preferred embodiments, and the actions and modules involved are not necessarily indispensable to the present application.

Embodiment 2

Figure 6:
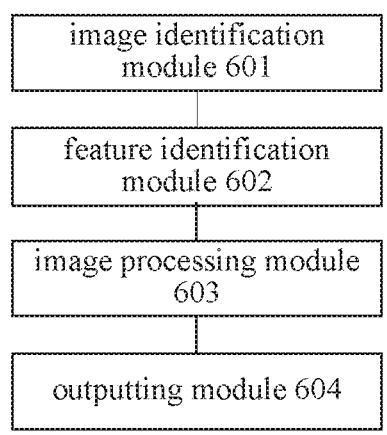
FIG. 6 is a schematic view of an optional vehicle monitoring apparatus according to an embodiment of the present application.

According to another aspect of embodiments of the present application, a vehicle monitoring apparatus is further provided. As shown in FIG. 6, the vehicle monitoring apparatus includes:

an image identification module 601, configured for identifying a vehicle window area image in a vehicle image obtained through monitoring;

a feature identification module 602, configured for performing feature identification on the vehicle window area image to obtain an identification result of a target feature;

an image processing module 603, configured for performing human eye sensory processing on the vehicle image and the vehicle window area image respectively, and stitching the processed vehicle image and the processed vehicle window area image to obtain a processed image; and an outputting module 604, configured for outputting the identification result of the target feature and the processed image.

Optionally, when the outputting module 604 is outputting the identification result of the target feature and the processed image, the identification result of the target feature and the processed image may be output synchronously.

Optionally, a vehicle image obtained through monitoring is an image involving the vehicle and its surround environment. The location to be monitored can be a cross-section or highway section in public roads, and can also be locations that have needs for vehicle monitoring, such as the underground parking area of a community and a public parking area. The status of the monitored vehicle in the vehicle image can be a driving status or a parking status. If the vehicle is in the driving status, the effect of the driving speed of the vehicle on the monitoring imaging is not limited here. If the vehicle is in a nighttime environment, the effect of nighttime lighting on the monitoring imaging is also not limited here.

In the above described embodiment of the present application, vehicle images of passing vehicles can be monitored by a high-definition checkpoint or a high-definition public safety checkpoint. The high-definition checkpoints monitors the vehicle lanes and the non-vehicle lanes of the road section to be monitored in all-weather real time with technologies such as advanced photoelectric technologies, computers, image processing, mode identification, and remote data access, and the relevant image data (i.e. the vehicle image in the embodiment) are recorded. After the vehicle image has been acquired, the shot vehicle image can be analyzed by a front-end processing system (e.g., a processor) to obtain from the vehicle image automatically data such as the passing time, location, driving direction, license plate number, license plate color, and vehicle body color of the vehicle, and the obtained information may be transmitted to a database of a high-definition checkpoint system control center via a computer network for processing such as data storing, querying, and comparison. When hit-and-run accidents or offences occur, or a suspicious vehicle is found, the system will automatically send an alarm signal to an interception system and relevant personnel.

The high-definition public safety checkpoint is directed to the maintenance of public safety, which acquires an image of the vehicle and the features of the driver and passer on the front seats for every vehicle that passes on a road, and automatically identifys the license plate of the vehicle, with advanced photoelectric technologies, image processing technologies, and mode identification technologies. By using high-definition public safety checkpoint systems for vehicle safety, accident-causing vehicles, peccancy vehicles, or vehicles in a black list can be very quickly captured, and the composition, traffic distribution, and violation of regulations of vehicles running on public roads are automatically recorded incessantly.

Optionally, the vehicle window area image is directed to a windshield area that can be identified in the vehicle image, for example, the windshield of the left and right vehicle windows of the front seats, the windshield of the left and right vehicle windows of the back seats, the windshield at the tail of the vehicle, and the windshield at the head of the vehicle. To obtain more target features and a vehicle window area image with more worthy of processing, in the present embodiment, images for the windshield at the head of the vehicle or the windshield of the left vehicle window of the front seats are selected as the vehicle window area image to be processed.

Optionally, the target feature can be, but is not limited to, one of: a vehicle license plate, a seatbelt, a sun-shading board, the face of the driver, and the driver's gesture of making a phone call. Based on different monitoring needs, the target feature can also be other identifiable features of the vehicle, the driver, or the driver's behavior.

A sun-shading board is a board at the front windshield and back windshield of a vehicle. It is designed to avoid glaring the eye due to the sunlight, and can be moved back and forth to block the sunlight so as to prevent traffic accidents.

Optionally, the human eye sensory processing in the present embodiment should be understood as: after a complete processing of the vehicle image, the obtained image processing result is suitable for sensory identification by a human eye. For example, the human eye is defined in the biology field as being capable of sensing light change within 30 Hz, at 100 times per second. Based on the biological property of the human eye, the vehicle image processed is easier to be identified by the human eye.

Figure 7:
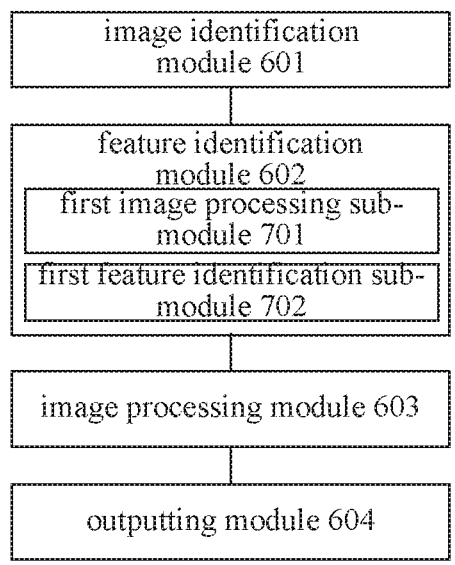
FIG. 7 is a schematic view of another optional vehicle monitoring apparatus according to an embodiment of the present application.

Optionally, as shown in FIG. 7, the feature identification module 602 includes:

a first image processing sub-module 701, configured for performing pre-processing on the vehicle window area image to obtain a pre-processed image; and a first feature identification sub-module 702, configured for performing the feature identification on the pre-processed image to obtain the identification result of the target feature.

Optionally, the method of the first image processing sub-module 701's performing pre-processing on the vehicle window area image can be: performing vehicle window detection on the YUV data (Y, U, and V represent, respectively, a pixel component) of the vehicle image inputted to obtain a rectangular vehicle window area, saving the YUV data corresponding to the rectangular vehicle window area, and performing in the following way image processing on the YUV data of the rectangular vehicle window area saved: automatic contrast enhancing, Gamma curve processing, USM (Unsharp Mask) sharpening, and processing by a noise-reduction module. Ultimately, the pre-processed image is obtained. USM sharpening is a tool in drawing software used for quickly focusing blurred boundaries of an image; Gamma curve processing is an image processing method of correcting the brightness deviation of an image in a monitor.

Optionally, the identification result obtained by the first feature identification sub-module 702 can be information perceived and understood by an ordinary operator of a monitoring device in a broad sense. The identification result can be displayed on a human-machine interface of an output device as a feature such as a value, a text, a symbol, or a color. For example, a sedan is monitored, and a vehicle image and a vehicle window area image are captured. After the image processing and feature identification in the embodiment described above, the identification result outputted by an output device is a text string, part of which can be "License Plate No.: Jing KD3457; Driver not using a cellphone; Driver not having seatbelt on."

Optionally, the identification result can also include other vehicle information, such as the type of the vehicle or the color of the vehicle. Here, the performing feature identification on the pre-processed image to obtain the identification result of the target feature in the embodiment is further described in detail in the case of using the type of the vehicle as vehicle information.

Optionally, the first feature identification sub-module 702 identifies the type of the vehicle in the vehicle image. It locates a vehicle window area in the vehicle image is located based on the type of the vehicle, and identifies the vehicle window area image corresponding to the vehicle window area. Specifically, a target region image can be determined based on vehicle position information in the vehicle image, wherein, the target region image is an image in the direction of the vehicle's principal view; contour features and texture features of the vehicle in the target region image are extracted; and, the type of the vehicle is obtained by identifying the contour features and texture features using a classifier.

Specifically, an area of interest at the front of the vehicle is set based on the vehicle detection position information, and when the texture features of the vehicle's contour are extracted, the type of the vehicle can be obtained by sending the texture features of the vehicle's contour to a classifier for training and predicting. For example, the type of the vehicle in the vehicle image is identified based on vehicle appearance features. Generally, the appearance features of vehicles such as trucks, sedans, and passenger cars are different. Thus, the types of the vehicle corresponding to vehicles such as trucks, sedans, and passenger cars in the embodiment are different. Further, the locations of a vehicle window area in vehicles of different type are also different based on the appearance design and specific configuration of vehicles of different types. For example, the locations of a vehicle window area having the driver's features are different in an ordinary sedan and a double-deck bus. Therefore, a vehicle window area in the vehicle image can be located based on the type of the vehicle, and the vehicle window area image corresponding to the vehicle window area can be identified. Specifically, vehicle window detection is performed on the YUV data of the vehicle image inputted, a rectangular vehicle window area is carved out, and the YUV data corresponding to the rectangular vehicle window area is saved. YUV (Y, U, and V represent, respectively, a pixel component) is a color encoding format, mainly refers to the pixel format with the luminance component and the chrominance components expressed separately, and is used for optimizing the transmission of color video signals.

Optionally, the first feature identification sub-module 702 can also send the pre-processed image, i.e., the YUV data of the rectangular vehicle window area after the image processing, to an assembly for identifying a target feature in a vehicle window area of a vehicle license plate identification algorithm, a seatbelt detection algorithm, a human face locating detection algorithm, a sun-shading board detection algorithm, and a cellphone-using detecting algorithm, and output and save the identification result of each target feature.

Figure 8:
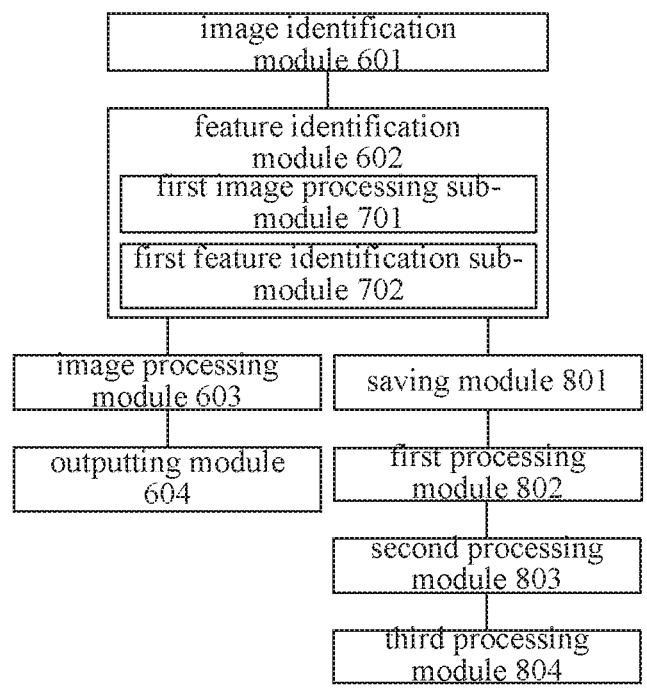
FIG. 8 is a schematic view of a third optional vehicle monitoring apparatus according to an embodiment of the present application.

Optionally, as shown in FIG. 8, the vehicle monitoring apparatus further includes:

a saving module 801, configured for saving image parameters of the identified pre-processed image, wherein, the image parameters include: a contrast ratio of the foreground and the background of the pre-processed image and/or a grayscale value of the pre-processed image;

a first processing module 802, configured for using the identification result, confidence of the identification result and the image parameters as feedback parameters;

a second processing module 803, configured for using the feedback parameters to adjust pre-processing parameters for the pre-processing performed on the vehicle window area image to obtain adjusted pre-processing parameters; and a third processing module 804, configured for using the adjusted pre-processing parameters to perform pre-processing on the current vehicle window area image and/or the next vehicle window area image, wherein, the pre-processing includes at least one of contrast enhancement, curve correction, sharpening, and noise reduction.

Optionally, in the present embodiment, the saving module 80*l* saves the image parameters of the pre-processed image identified. The image parameters can be the contrast ratio of the foreground and the background of the pre-processed image, or the grayscale value of the pre-processed image, or can include both. By saving a large amount of image parameters and performing statistical analysis, the image processing strategy can be adjusted and perfected. The confidence of the identification result can be obtained by performing statistical analysis on identification error rate or accuracy rate in a large amount of image identification samples Optionally, the first processing module 802's using the confidence of the identification result as a feedback parameter includes: obtaining the confidence of the identification result by performing statistical analysis on the identification result, wherein, the method of performing statistical analysis on the identification result includes: determining whether each identification result (such as the identification result of a feature of the driver making a call, the identification result of a feature of unfolding a sun-shading board of the vehicle, and the identification result of a feature of the driver having the seatbelt on) is accurate; counting the number of accurate identification results to obtain the accuracy rate of the identification result, and determining the confidence of the accuracy rate.

The identification result can be provided in the form of yes/no. For example, if a feature of the driver's making a call is present in the image, and the identification result is yes, then the identification result is accurate; if the identification result is no, then the identification result is inaccurate.

Optionally, the identification results can be labeled based on the determined result. If an identification result is accurate, its determined result is labeled 1. If an identification result is inaccurate, its determined result is labeled 0. The determined results of the identification results are then added together to obtain the number of accurate identification results, and the ration between the number of accurate identification results and the total number of identification results is calculated to obtain the accuracy rate.

Optionally, a confidence is generally used to indicate a probability assurance that the error between a sampled index and the total index does not exceed a certain range. Specifically, in the embodiment, the confidence is used to indicate a probability assurance that the error between the identification result and a pre-stored historic identification result does not a certain range. Therefore, the confidence can be used to evaluate the accuracy of the identification result. Thus, by using the confidence as a feedback parameter, the result of adjusting pre-processing parameters can be more reliable.

Figure 9:
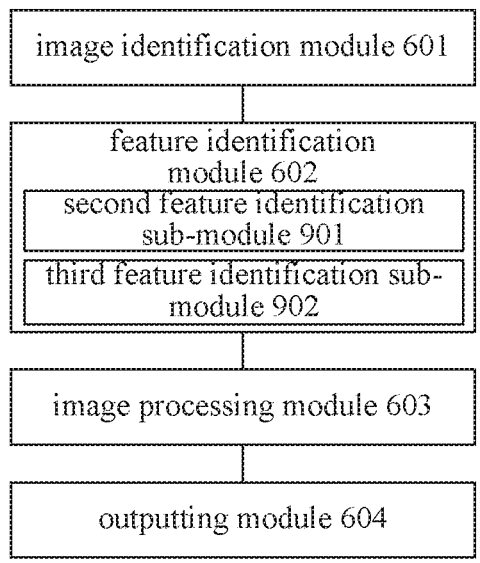
FIG. 9 is a schematic view of a fourth optional vehicle monitoring apparatus according to an embodiment of the present application.

Optionally, as shown in FIG. 9, the feature identification module 602 includes:

a second feature identification sub-module 901, configured for identifying a human facial feature of the driver of the vehicle in the vehicle window area image; and a third feature identification sub-module 902, configured for identifying whether there is a driving status feature in the vehicle window area image to obtain a status identification result, wherein, the driving status feature include at least one of a feature indicating that the driver is making a phone call, a feature indicating that the sun-shading board of the vehicle is unfolded, and a feature indicating that the driver is wearing the seatbelt, and wherein, the identification result includes the human facial feature of the driver and the status identification result.

After the third feature identification sub-module 902 obtains the status identification result, in conjunction with the human facial feature of the driver obtained by the second feature identification sub-module 901, the identification result of the target feature can be obtained.

Optionally, the second feature identification sub-module 901's identifying a human facial feature of the driver of the vehicle in the vehicle window area image includes: obtaining a historic vehicle window area image imaged before the imaging time of the vehicle window area image; extracting a human facial feature of the driver in the historic vehicle window area image; obtaining a human facial feature detector by performing Haar feature (i.e., Haar-like feature, a feature description operator commonly used in the field of computer vision) calculation on the human facial feature of the driver in the historic vehicle window area image.

Optionally, the second feature identification sub-module 901, by selecting and training the Haar feature of the human face of the driver in the vehicle window area image, forms a detector, and then uses the detector to perform human face detection on the driver.

Optionally, the third feature identification sub-module 902's identifying a driving status feature of the driver in the vehicle window area image to obtain a status identification result includes: obtaining a historic vehicle window area image imaged before the imaging time of the vehicle window area image; extracting a boundary feature of the sun-shading board of the vehicle in the vehicle window area image; obtaining a sun-shading board unfolding status feature detector by processing the boundary feature of the sun-shading board of the vehicle in the historic vehicle window area image; identifying the sun-shading board unfolding status feature of the vehicle in the vehicle window area image through the sun-shading board unfolding status feature detector to obtain an identification result of the sun-shading board unfolding status feature.

Optionally, the third feature identification sub-module 902, by selecting and training a boundary feature of the sun-shading board in the vehicle window area image, forms a detector, and then performs sun-shading board detection to determine whether the sun-shading board is unfolded.

Optionally, the third feature identification sub-module 902's identifying a driving status feature of the driver in the vehicle window area image to obtain a status identification result further includes: extracting position information, boundary features and texture features of the driver of the vehicle in the vehicle window area image; obtaining an identification result of the feature of the driver's making a call by using a classifier to identify the position information and boundary features; obtaining an identification result of a seatbelt status feature by using a classifier to identify the position information and the texture features.

Optionally, the third feature identification sub-module 902 extracts position information and texture features of the driver in the vehicle window area image, and sends the position information and texture features of the driver to a classifier for training and predicting to obtain an identification result of whether the driver is wearing a seatbelt.

Optionally, the third feature identification sub-module 902 extracts position information and boundary features of the driver in the vehicle window area image, and sends the position information and boundary features of the driver to a classifier for training and predicting to obtain an identification result of whether the driver is making a call.

Figure 10:
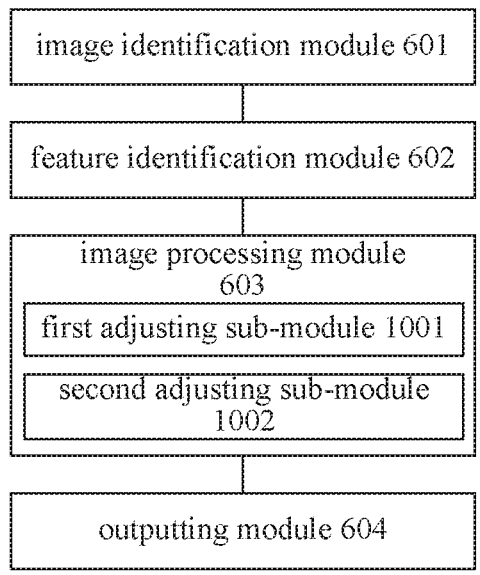
FIG. 10 is a schematic view of a fifth optional vehicle monitoring apparatus according to an embodiment of the present application.
Figure 11:
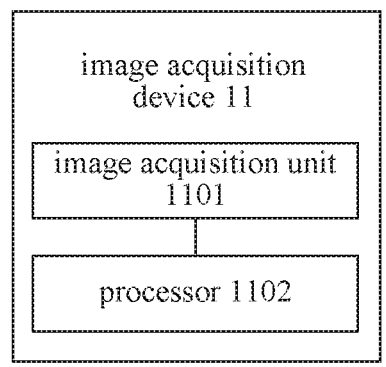
FIG. 11 is a schematic view of an optional image acquisition device according to an embodiment of the present application.

Optionally, as shown in FIG. 10, the image processing module 603 includes:

a first adjusting sub-module 1001, configured for performing highlight and/or shadow adjustment on the vehicle image to obtain the processed vehicle image; and a second adjusting sub-module 1002, configured for adjusting the contrast coefficient of each pixel point in the vehicle window area image to obtain the processed vehicle window area image.

The first adjusting sub-module 1001 can perform highlight and/or shadow adjustment on the YUV data of the vehicle image inputted to obtain the processed vehicle image. The highlight and/or shadow adjustment can be performed in conjunction with the following processing modes: automatic contract enhancing, Gamma curve processing, USM sharpening, and processing by a noise-reduction module.

Optionally, the mode of the second adjusting sub-module 1002's performing human eye sensory processing on the vehicle window area image can be: performing vehicle window detection on the YUV data of the vehicle image inputted, selecting a rectangular vehicle window area, and saving the YUV data corresponding to the rectangular vehicle window area; then, adjusting the contrast factor of every pixel point in the vehicle window area image to obtain the processed vehicle window area image. The adjustment of the contrast factor can be performed in conjunction with the following processing modes: automatic contract enhancing, Gamma curve processing, USM sharpening, and processing by a noise-reduction module; then saving the YUV data of the rectangular vehicle window area after one round of image processing; further performing a second round of image processing on the YUV data of the rectangular vehicle region area, including: automatic contract enhancing, Gamma curve processing, USM sharpening, and processing by a noise-reduction module. Finally, the processed YUV data of the vehicle window area, i.e., the processed vehicle window area image, is saved.

Optionally, the image processing module 603 further includes:

a stitching module, configured for stitching any one edge of the processed vehicle image and one edge of the processed vehicle window area image to obtain the processed image; or a replacing module, configured for replacing the vehicle window portion in the processed vehicle image with the processed vehicle window area image to obtain the processed image.

Optionally, the stitching module stitching the processed vehicle image and the processed vehicle window area image to obtain a processed image can be: saving and stitching the processed YUV data of the vehicle image and the processed YUV data of the vehicle window area image into one image. The processed image can meet the human eye sensory requirements, and can represent relatively well the requirement that the vehicle region be see-through and the vehicle window be locally transparent. There are multiple modes of stitching the processed vehicle image and the processed vehicle window area image. For example, any one edge of the processed vehicle image is stitched with an edge of the processed vehicle window area image to obtain the processed image. Specifically, as shown in FIG. 4, the right edge of the processed vehicle image and the left edge of the processed vehicle window area image can be stitched left-right horizontally. Or, as shown in FIG. 5, the bottom edge of the processed vehicle image and the top edge of the processed vehicle window area image can be stitched up-down vertically. Optionally, when one edge of the processed vehicle image is stitched with the processed vehicle window area image, the two edges can be stitched together completely or partially. In addition, the replacing module replaces the image of the vehicle window area portion in the processed vehicle image by the processed vehicle window area image.

According to another aspect of embodiments of the present application, a processor is further provided, including a vehicle monitoring apparatus of any one of the above embodiments.

The processor can be provided in a snapshot machine at a high-definition checkpoint or a high-definition public safety checkpoint. The snapshot machine can be a work platform for seeing through a vehicle window and detecting a target feature in a vehicle window area.

In embodiments of the present application, by identifying a vehicle window area image in a vehicle image obtained through monitoring, performing feature identification on the vehicle window area image to obtain an identification result of a target feature, performing human eye sensory processing on the vehicle image and the vehicle window area image respectively, and then stitching the processed vehicle image and the processed vehicle window area image to obtain a processed image, and ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

According to another aspect of embodiments of the present application, an image acquisition device 11 is further provided. The image acquisition device 11 includes:

an image acquisition unit 1101, configured for acquiring a vehicle image of a vehicle when the vehicle enters into a predetermined location; and a processor 1102, which is connected with the image acquisition unit and configured for identifying a vehicle window area image in the vehicle image; performing feature identification on the vehicle window area image to obtain an identification result of a target feature; performing human eye sensory processing on the vehicle image and the vehicle window area image respectively, and stitching the processed vehicle image and the processed vehicle window area image to obtain a processed image; and, outputting the identification result of the target feature and the processed image.

Optionally, when the processor 1102 outputs the identification result of the target feature and the processed image, simultaneous outputting can be used to output the identification result of the target feature and the processed image.

The image acquisition device can be provided at a high-definition checkpoint: or a high-definition public safety checkpoint.

With the image acquisition device in the embodiment, after identifying a vehicle window area image in a vehicle image obtained through monitoring, performing feature identification on the vehicle window area image to obtain an identification result of a target feature, performing human eye sensory processing on the vehicle image and the vehicle window area image respectively, and then stitching the processed vehicle image and the processed vehicle window area image to obtain a processed image, and ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

Optionally, the mode for the processor 1102 performing human eye sensory processing on the vehicle image can be: performing vehicle window detection on the YUV data of the vehicle image inputted, selecting a rectangular vehicle window area, and saving the YUV data corresponding to the rectangular vehicle window area; then, performing vehicle image processing based on a human eye sensory strategy on the inputted YUV data of the vehicle image, including: automatic contract enhancing, Gamma curve processing, USM sharpening, and processing by a noise-reduction module; finally, saving the YUV data of the vehicle image, i.e., the processed vehicle image.

Optionally, the mode for the processor 1102 performing human eye sensory processing on the vehicle image can be: performing vehicle window detection on the YUV data of the vehicle image inputted, selecting a rectangular vehicle window area, and saving the WV data corresponding to the rectangular vehicle window area; then, performing one round of image processing on the YUV data of the outputted rectangular vehicle window area, including: automatic contract enhancing, Gamma curve processing, USM sharpening, and processing by a noise-reduction module; then saving the YUV data of the rectangular vehicle window area after one round of image processing; further performing a second round of image processing on the YUV data of the rectangular vehicle region area (i.e., vehicle window area image processing based on a human eye sensory strategy), including: automatic contract enhancing, Gamma curve processing, USM sharpening, and processing by a noise-reduction module. Finally, the processed. YUV data of the vehicle window area, i.e., the processed vehicle window area image, is saved.

Optionally, the processor 1102 stitching the processed vehicle image and the processed vehicle window area image to obtain a processed image can be: saving and stitching the processed YUV data of the vehicle image and the processed YUV data of the vehicle window area image into one image. The processed image can meet the human eye sensory requirements, and can represent relatively well the requirement that the vehicle region be see-through and the vehicle window be locally transparent. There are multiple modes of stitching the processed vehicle image and the processed vehicle window area image. For example, any one edge of the processed vehicle image is stitched with an edge of the processed vehicle window area image to obtain the processed image. Specifically, as shown in FIG. 4, the right edge of the processed vehicle image and the left edge of the processed vehicle window area image can be stitched left-right horizontally. Or, as shown in FIG. 5, the bottom edge of the processed vehicle image and the top edge of the processed vehicle window area image can be stitched up-down vertically. Optionally, when one edge of the processed vehicle image is stitched with the processed vehicle window area image, the two edges can be stitched together completely or partially. In addition, the image of the vehicle window area portion in the processed vehicle image can be replaced by the processed vehicle window area image.

Figure 12:
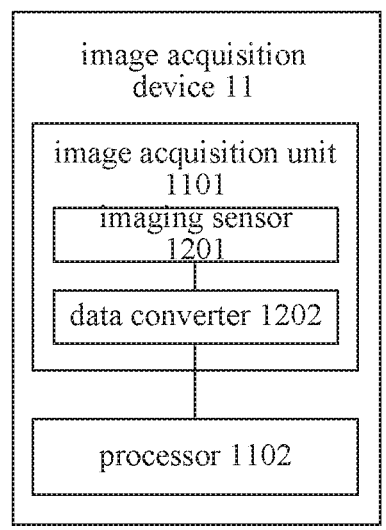
FIG. 12 is a schematic view of another optional image acquisition device according to an embodiment of the present application.

Optionally, as shown FIG. 12, the image acquisition unit 1101 includes:

an imaging sensor 1201, configured for capturing an image of the vehicle when the vehicle enters into a predetermined location; and a data converter 1202, which is connected with the imaging sensor and the processing device respectively, and configured for converting the image into a vehicle image with a YUV data format and inputting the vehicle image to the processor 1102.

The data converter can be an analog/digital converter.

Optionally, the imaging sensor 1201 is configured for monitoring a scene with a snapshot machine when a vehicle is in the course of driving or parking. When the vehicle enters a predetermined snapshot location, a video detection algorithm running in a principal processor will automatically trigger the image acquisition unit to take a snapshot of the image of the vehicle passing.

Optionally, the data converter 1202 will send the image captured by the imaging sensor 1201 to the next step of processing in the form of YUV data, so that the image ultimately outputted can meet the effect of a see-through vehicle window and the identification result of the vehicle window area's target feature can be more accurate.

Optionally, the image acquisition device can be formed by four parts: a lens, an image acquisition unit (an imaging sensor, A/D converting module, FPGA programmable logic controller), a principal controller, and a SDRAM.

Figure 13:
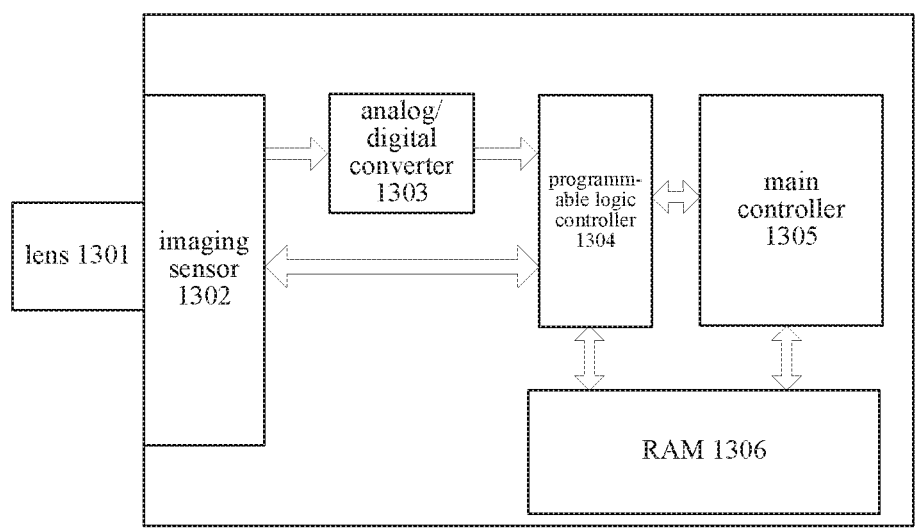
FIG. 13 is a schematic view of a third optional image acquisition device according to an embodiment of the present application.

Optionally, in an optional embodiment of the image acquisition device as shown in FIG. 13, the image acquisition device includes: a lens 1301, an image acquisition unit, a main controller 1305, and a RAM 1306. The image acquisition unit includes: an imaging sensor 1302, an analog/digital converter 1303, and a programmable logic controller 1304.

In the embodiment, a vehicle image is captured by the lens and the imaging sensor, and sent to the principal controller via the analog/digital converter (i.e., the data converter in the above described embodiment) and the programmable logic controller. The principal controller performs the functions of the processor in the above described embodiment. The RAM is configured for storing the vehicle image in the above described embodiment, and intermediate data produced in the course of processing the vehicle image.

The image acquisition device in the embodiment can be a snapshot machine; the principal controller in it can include a high-performance ARM processor and DSP processor.

Figure 14:
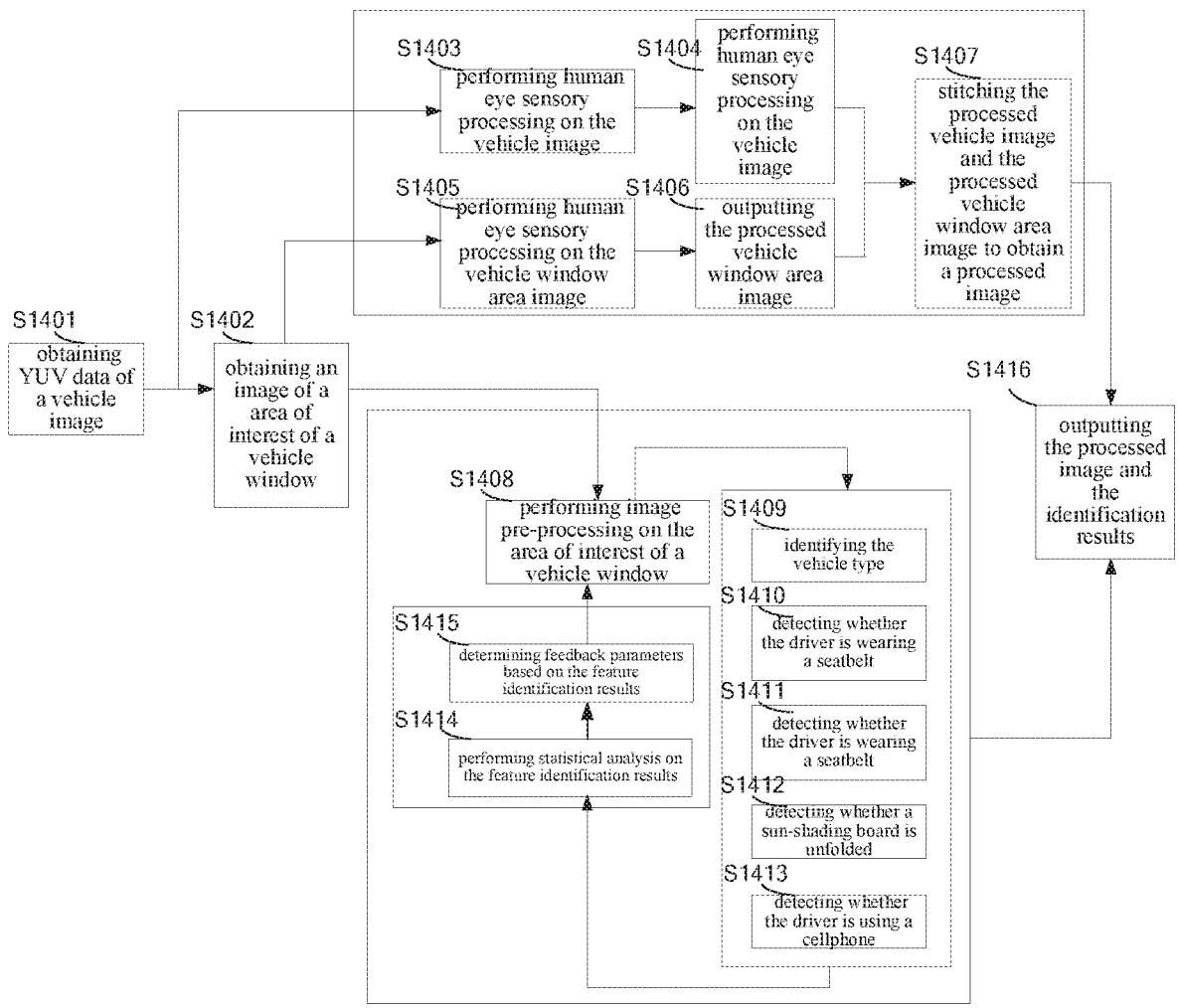
FIG. 14 is a schematic flow chart of an optional monitoring method according to an embodiment of the present application.

Optionally, a vehicle monitoring method is shown in FIG. 14. The embodiment includes the following steps:

step S1401, obtaining YUV data of a vehicle image.

Specifically, the vehicle image can be obtained at a high-definition checkpoint or a high-definition public safety checkpoint.

step S1402, obtaining an image of a area of interest of a vehicle window.

Specifically, an image of a area of interest of a vehicle window can be obtained through a vehicle ROI (i.e., an area of interest of a vehicle window) locating module. The image of a area of interest of a vehicle window is the vehicle window area image in the above described embodiments.

Optionally, the vehicle ROI locating module can perform vehicle window detection on the YUV data of the checkpoint image obtained (i.e., the YUV data of the vehicle image in the above described embodiments), carving out a rectangular area of a vehicle window area from the vehicle image, and saving the YUV data of a vehicle window area image.

step S1403, performing human eye sensory processing on the vehicle image. That is, performing human eye sensory processing on the vehicle image to obtain a see-through vehicle image. This step can be in parallel with step S1402.

Specifically, after the YUV data of the checkpoint image is obtained, image processing is performed on it, and the YUV data of the checkpoint image, i.e., the see-through vehicle image, is saved, wherein, the image processing includes human eye sensory-oriented processing, and can further include at least one of automatic contrast enhancing, Gamma curve processing, USM sharpening, and noise-reduction processing.

step S1404, output the processed vehicle image (i.e., the see-through vehicle image).

step S1405, performing human eye sensory processing on the vehicle window area image.

Here, the vehicle window area image is the area of interest of a vehicle window.

Specifically, after the YUV data of the vehicle window area image is obtained, image processing is performed on it, and the YUV data of the vehicle window area image, i.e., a transparent vehicle window area image, is saved, wherein, the image processing includes human eye sensory-oriented processing, and can further include at least one of automatic contrast enhancing, Gamma curve processing, USM sharpening, and noise-reduction processing.

step S1406, outputting the processed vehicle window area image (i.e., the transparent vehicle window area image).

step S1407, stitching the processed vehicle image and the processed vehicle window area image to obtain a processed image.

There are various modes of stitching in the embodiment: the processed vehicle image and the processed vehicle window area image can be stitched in a left-right or up-down way, and the processed vehicle window area image can also be used to replace a vehicle window portion in the complete processed image.

Step S106 of the embodiment in FIG. 1 can be realized by the steps S1403 to S1407, which can be processed by an image processing module.

The processed image obtained the embodiment can the human eye sensory requirements, and can represent relatively well the requirement that the vehicle region be see-through and the vehicle window be locally transparent.

step S1408, performing image pre-processing on the area of interest of a vehicle window.

This step can be in parallel with step S1405.

Here, the area of interest of a vehicle window is the vehicle window area image in the above described embodiments.

Image pre-processing is performed on the vehicle window area image identified to obtain a pre-processed image, and the YUV data of the pre-processed image is saved. The pre-processing includes at least one of the following: automatic contrast enhancing, Gamma curve processing, USM sharpening, and noise-reduction processing.

step S1409, identifying the vehicle type.

Here, identifying vehicle type includes: identifying the license plate of the vehicle in the vehicle image and identifying the type of the vehicle in the vehicle image. Here, the type of the vehicle includes: trucks, passenger cars, sedans, etc.

step S1410, detecting whether the driver is wearing a seatbelt.

The detection result can be: seatbelt on (which can be indicated by positive identification) and seatbelt off (which can be indicated by negative identification).

step S1411, locating a human facial feature of the driver.

step S1412, detecting whether a sun-shading board is unfolded.

The detection result can be: folding (which can be indicated by positive identification) and unfolding (which can be indicated by negative identification).

step S1413, detecting whether the driver is using a cellphone.

The detection result can be: using a cellphone (which can be indicated by positive identification) and not using a cellphone (which can be indicated by negative identification).

Steps S1409 to S1413 can be processed in parallel.

step S1414, performing statistical analysis on the feature identification results. That is, performing statistical analysis on the feature identification results of steps S1409 to S1413.

step S1415, determining feedback parameters based on the feature identification results.

step S1416, outputting the processed image and the identification results.

In the embodiment of the present application, by identifying a vehicle window area image in a vehicle image obtained through monitoring, performing feature identification on the vehicle window area image to obtain an identification result of a target feature; and performing human eye sensory processing on the vehicle image and the vehicle window area image respectively, and then stitching the processed vehicle image and the processed vehicle window area image to obtain a processed image; ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

An application program is provided in an embodiment of the present application. The application program is configured for carrying out a vehicle monitoring method provided by embodiments of the present application when being executed. The vehicle monitoring method includes:

identifying a vehicle window area image in a vehicle image obtained through monitoring;

performing feature identification on the vehicle window area image to obtain an identification result of a target feature;

performing human eye sensory processing on the vehicle image and the vehicle window area image respectively, and stitching the processed vehicle image and the processed vehicle window area image to obtain a processed image; and outputting the identification result of the target feature and the processed image.

In one implementation of the present application, in the vehicle monitoring method executed by the application program when being executed, performing feature identification on the vehicle window area image to obtain an identification result of a target feature includes:

performing pre-processing on the vehicle window area image to obtain a pre-processed image; and performing the feature identification on the pre-processed image to obtain the identification result of the target feature.

In one implementation of the present application, in the vehicle monitoring method executed by the application program when being executed, after performing feature identification on the vehicle window area image to obtain an identification result of a target feature, the method further includes:

saving image parameters of the identified pre-processed image, wherein, the image parameters include: a contrast ratio of the foreground and the background of the pre-processed image and/or a grayscale value of the pre-processed image;

using the identification result, confidence of the identification result and the image parameters as feedback parameters;

using the feedback parameters to adjust pre-processing parameters for the pre-processing performed on the vehicle window area image to obtain adjusted pre-processing parameters; and using the adjusted pre-processing parameters to perform pre-processing on the current vehicle window area image and/or the next vehicle window area image, wherein, the pre-processing includes at least one of contrast enhancement, curve correction, sharpening, and noise reduction.

In one implementation of the present application, in the vehicle monitoring method executed by the application program when being executed, performing feature identification on the vehicle window area image to obtain an identification result of a target feature includes:

identifying a human facial feature of the driver of the vehicle in the vehicle window area image; and identifying whether there is a driving status feature in the vehicle window area image to obtain a status identification result, wherein, the driving status feature includes at least one of a feature indicating that the driver is making a phone call, a feature indicating that the sun-shading board of the vehicle is unfolded, and a feature indicating that the driver is wearing the seatbelt, wherein, the identification result includes the human facial feature of the driver and the status identification result.

In one implementation of the present application, in the vehicle monitoring method executed by the application program when being executed, performing human eye sensory processing on the vehicle image and the vehicle window area image respectively includes:

performing highlight and/or shadow adjustment on the vehicle image to obtain the processed vehicle image; and adjusting the contrast coefficient of each pixel point in the vehicle window area image to obtain the processed vehicle window area image.

In one implementation of the present application, in the vehicle monitoring method executed by the application program when being executed, stitching the processed vehicle image and the processed vehicle window area image to obtain a processed image includes:

stitching any one edge of the processed vehicle image and one edge of the processed vehicle window area image to obtain the processed image; or, replacing the vehicle window portion in the processed vehicle image with the processed vehicle window area image to obtain the processed image.

In the embodiment of the present application, in the application program being used for executing the vehicle monitoring method, by identifying a vehicle window area image in a vehicle image obtained through monitoring, performing feature identification on the vehicle window area image to obtain an identification result of a target feature; and performing human eye sensory processing on the vehicle image, to obtain a processed image; ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

A storage medium is provided by an embodiment of the present application. The storage medium is used for storing an application program, which is configured for executing a vehicle monitoring method provided by embodiments of the present application. The vehicle monitoring method can include:

identifying a vehicle window area image in a vehicle image obtained through monitoring;

performing feature identification on the vehicle window area image to obtain an identification result of a target feature;

performing human eye sensory processing on the vehicle image and the vehicle window area image respectively, and stitching the processed vehicle image and the processed vehicle window area image to obtain a processed image; and outputting the identification result of the target feature and the processed image.

In one implementation of the present application, in the vehicle monitoring method executed by the application program stored in the storage medium when being executed, performing feature identification on the vehicle window area image to obtain an identification result of a target feature includes:

performing pre-processing on the vehicle window area image to obtain a pre-processed image; and performing the feature identification on the pre-processed image to obtain the identification result of the target feature.

In one implementation of the present application, in the vehicle monitoring method executed by the application program stored in the storage medium when being executed, after performing feature identification on the vehicle window area image to obtain an identification result of a target feature, the method further includes:

saving image parameters of the identified pre-processed image, wherein, the image parameters include: a contrast ratio of the foreground and the background of the pre-processed image and/or a grayscale value of the pre-processed image;

using the identification result, confidence of the identification result and the image parameters as feedback parameters;

using the feedback parameters to adjust pre-processing parameters for the pre-processing performed on the vehicle window area image to obtain adjusted pre-processing parameters; and using the adjusted pre-processing parameters to perform pre-processing on the current vehicle window area image and/or the next vehicle window area image, wherein, the pre-processing includes at least one of contrast enhancement, curve correction, sharpening, and noise reduction.

In one implementation of the present application, in the vehicle monitoring method executed by the application program stored in the storage medium when being executed, performing feature identification on the vehicle window area image to obtain an identification result of a target feature includes:

identifying a human facial feature of the driver of the vehicle in the vehicle window area image; and identifying whether there is a driving status feature in the vehicle window area image to obtain a status identification result, wherein, the driving status feature includes at least one of a feature indicating that the driver is making a phone call, a feature indicating that the sun-shading board of the vehicle is unfolded, and a feature indicating that the driver is wearing the seatbelt, wherein, the identification result includes the human facial feature of the driver and the status identification result.

In one implementation of the present application, in the vehicle monitoring method executed by the application program stored in the storage medium when being executed, performing human eye sensory processing on the vehicle image and the vehicle window area image respectively includes:

performing highlight and/or shadow adjustment on the vehicle image to obtain the processed vehicle image; and adjusting the contrast coefficient of each pixel point in the vehicle window area image to obtain the processed vehicle window area image.

In one implementation of the present application, in the vehicle monitoring method executed by the application program stored in the storage medium when being executed, stitching the processed vehicle image and the processed vehicle window area image to obtain a processed image includes:

stitching any one edge of the processed vehicle image and one edge of the processed vehicle window area image to obtain the processed image; or, replacing the vehicle window portion in the processed vehicle image with the processed vehicle window area image to obtain the processed image.

In the embodiment of the present application, the storage medium being configured for storing the application program configured for executing the vehicle monitoring method, by identifying a vehicle window area image in a vehicle image obtained through monitoring, performing feature identification on the vehicle window area image to obtain an identification result of a target feature; and performing human eye sensory processing on the vehicle image to obtain a processed image; ultimately outputting the identification result of the target feature and the processed image, the effect of accurately identifying the target feature of the monitored vehicle and conforming the processed image to the sensory of human eyes is achieved, thus solving the technical problem of relatively low identification rate in vehicle monitoring by image detection.

The numbering of the above described embodiments in the present application is merely for description purposes, and does not represent which one is better or worse.

In the above described embodiments of the present application, the description of each embodiment has its own focus. For what is not described in detail for one embodiment, one can refer to the relevant description in other embodiments.

In the several embodiments provided in the present application, it should be understood that the technical contents disclosed can be implemented in other ways. The apparatus embodiments described above are merely illustrative. For example, the classification of units can be a classification based on logical function. In practice, when implemented, it can be classified in another way. For example, multiple units or components can be combined or integrated into another system, or certain features can be omitted, or not executed. In addition, the inter-coupling or direct coupling or communicative connection illustrated or discussed can be through certain interfaces, and indirect coupling or communicative connection between units or modules can be electric or other forms.

Units described as separate parts can be or not be physically separated. Parts illustrated as a unit can be or not be a physical unit (i.e., located at one location), or be distributed on multiple units. Some or all of the parts can be selected based on actual needs to achieve the objective of the solution of the present embodiments.

In addition, the various functional units in the various embodiments of the present application can be integrated into one processing unit, or can exist physically separately, or two or more units can be integrated into one unit. The integrated units can be implemented via hardware, or can implemented via software functional units.

If an integrated unit is implemented via a software functional unit, and sold or used as a separate product, it can be stored in a computer readable storage medium. Based on this understanding, the essence of the technical solution of the present application, or the part that constitutes contribution to the prior art, or all or part of the technical solution, can be embodied in a software product. The computer software product is stored in a storage medium, and includes instructions used for making a computer device (which can be a personal computer, a server, a network device, etc.) execute all or some of the steps of a method described in various embodiments of the present application. The storage medium includes various kinds of medium capable of storing program codes such as flash disk, Read-Only Memory (ROM), Random Access Memory (RAM), portable disk, magnetic disk, and CD.

What has been described above are merely preferred modes of realization of the present application. It should be noted that for those skilled in the art, improvements and changes may be made without departing the principle of the present application, and such improvements and changes should be deemed to fall within the scope of protection of the present application.

The invention claimed is:

1. A vehicle monitoring method, comprising:
identifying a vehicle window area image in a vehicle image obtained through monitoring;
performing feature identification on the vehicle window area image to obtain an identification result of a target feature;
performing human eye sensory processing on the vehicle image and the vehicle window area image respectively, and stitching the processed vehicle image and the processed vehicle window area image to obtain a processed image; and
outputting the identification result of the target feature and the processed image,
wherein stitching the processed vehicle image and the processed vehicle window area image to obtain a processed image comprises:
stitching any one edge of the processed vehicle image and one edge of the processed vehicle window area image to obtain the processed image; or,
replacing the vehicle window portion in the processed vehicle image with the processed vehicle window area image to obtain the processed image.

2. The vehicle monitoring method of claim 1, wherein, performing feature identification on the vehicle window area image to obtain an identification result of a target feature comprises:
performing pre-processing on the vehicle window area image to obtain a pre-processed image; and
performing the feature identification on the pre-processed image to obtain the identification result of the target feature.

3. The vehicle monitoring method of claim 2, wherein, after performing feature identification on the vehicle window area image to obtain an identification result of a target feature, the method further comprises:
saving image parameters of the identified pre-processed image, wherein, the image parameters comprise: a contrast ratio of the foreground and the background of the pre-processed image and/or a grayscale value of the pre-processed image;
using the identification result, confidence of the identification result and the image parameters as feedback parameters;
using the feedback parameters to adjust pre-processing parameters for the pre-processing performed on the vehicle window area image to obtain adjusted pre-processing parameters; and
using the adjusted pre-processing parameters to perform pre-processing on the current vehicle window area image and/or the next vehicle window area image, wherein, the pre-processing comprises at least one of contrast enhancement, curve correction, sharpening, and noise reduction.

4. The vehicle monitoring method of claim 1, wherein, performing feature identification on the vehicle window area image to obtain an identification result of a target feature comprises:
identifying a human facial feature of the driver of the vehicle in the vehicle window area image; and
identifying whether there is a driving status feature in the vehicle window area image to obtain a status identification result, wherein, the driving status feature comprises at least one of a feature indicating that the driver is making a phone call, a feature indicating that the sun-shading board of the vehicle is unfolded, and a feature indicating that the driver is wearing the seatbelt,
wherein, the identification result comprises the human facial feature of the driver and the status identification result.

5. The vehicle monitoring method of claim 1, wherein, performing human eye sensory processing on the vehicle image and the vehicle window area image respectively comprises:
performing highlight and/or shadow adjustment on the vehicle image to obtain the processed vehicle image; and
adjusting the contrast coefficient of each pixel point in the vehicle window area image to obtain the processed vehicle window area image.

6. A vehicle monitoring apparatus, comprising:
an image identification module, configured for identifying a vehicle window area image in a vehicle image obtained through monitoring;
a feature identification module, configured for performing feature identification on the vehicle window area image to obtain an identification result of a target feature;
an image processing module, configured for performing human eye sensory processing on the vehicle image and the vehicle window area image respectively, and stitching the processed vehicle image and the processed vehicle window area image to obtain a processed image; and
an outputting module, configured for outputting the identification result of the target feature and the processed image,
wherein, the image processing module further comprises:
a stitching module, configured for stitching any one edge of the processed vehicle image and one edge of the processed vehicle window area image to obtain the processed image; or,
a replacing module, configured for replacing the vehicle window portion in the processed vehicle image with the processed vehicle window area image to obtain the processed image.

7. The vehicle monitoring apparatus of claim 6, wherein, the feature identification module comprises:

a first image processing sub-module, configured for performing pre-processing on the vehicle window area image to obtain a pre-processed image; and a first feature identification sub-module, configured for performing the feature identification on the pre-processed image to obtain the identification result of the target feature.

8. The vehicle monitoring apparatus of claim 7, wherein, the vehicle monitoring apparatus further comprises:

a saving module, configured for saving image parameters of the identified pre-processed image, wherein, the image parameters comprise: a contrast ratio of the foreground and the background of the pre-processed image and/or a grayscale value of the pre-processed image;

a first processing module, configured for using the identification result, confidence of the identification result and the image parameters as feedback parameters;

a second processing module, configured for using the feedback parameters to adjust pre-processing parameters for the pre-processing performed on the vehicle window area image to obtain adjusted pre-processing parameters; and a third processing module, configured for using the adjusted pre-processing parameters to perform pre-processing on the current vehicle window area image and/or the next vehicle window area image, wherein, the pre-processing comprises at least one of contrast enhancement, curve correction, sharpening, and noise reduction.

9. The vehicle monitoring apparatus of claim 6, wherein, the feature identification module further comprises:

a second feature identification sub-module, configured for identifying a human facial feature of the driver of the vehicle in the vehicle window area image; and a third feature identification sub-module, configured for identifying whether there is a driving status feature in the vehicle window area image to obtain a status identification result, wherein, the driving status feature comprises at least one of a feature indicating that the driver is making a phone call, a feature indicating that the sun-shading board of the vehicle is unfolded, and a feature indicating that the driver is wearing the seatbelt, and wherein, the identification result comprises the human facial feature of the driver and the status identification result.

10. The vehicle monitoring apparatus of claim 6, wherein, the image processing module comprises:

a first adjusting sub-module, configured for performing highlight and/or shadow adjustment on the vehicle image to obtain the processed vehicle image; and a second adjusting sub-module, configured for adjusting the contrast coefficient of each pixel point in the vehicle window area image to obtain the processed vehicle window area image.

11. A processor, comprising the vehicle monitoring apparatus of claim 6.

12. An image acquisition device, comprising:

an image acquisition unit, configured for acquiring a vehicle image of a vehicle when the vehicle enters into a predetermined location; and the processor of claim 11, which is connected with the image acquisition unit and configured for identifying a vehicle window area image in the vehicle image; performing feature identification on the vehicle window area image to obtain an identification result of a target feature; performing human eye sensory processing on the vehicle image and the vehicle window area image respectively, and stitching the processed vehicle image and the processed vehicle window area image to obtain a processed image; and, outputting the identification result of the target feature and the processed image.

13. The image acquisition device of claim 12, wherein, the image acquisition unit comprises:

an imaging sensor, configured for capturing an image of the vehicle when the vehicle enters into a predetermined location; and a data converter, which is connected with the imaging sensor and the processing device respectively, and configured for converting the image into a vehicle image with a YUV data format and inputting the vehicle image to the processor.

14. A non-transitory storage medium, which is used for storing an application program configured for carrying out the vehicle monitoring method of claim 1.

15. A vehicle monitoring apparatus, comprising:

a processor, a memory, communication interfaces and a bus, wherein, the processor, the memory and the communication interfaces connect to and communicate with each other via the bus;

the memory is configured to store executable program codes;

the processor is configured to execute programs corresponding to the executable program codes by reading the executable program codes stored in the memory to perform:

identifying a vehicle window area image in a vehicle image obtained through monitoring;

performing feature identification on the vehicle window area image to obtain an identification result of a target feature;

performing human eye sensory processing on the vehicle image and the vehicle window area image respectively, and stitching the processed vehicle image and the processed vehicle window area image to obtain a processed image; and outputting the identification result of the target feature and the processed image, wherein stitching the processed vehicle image and the processed vehicle window area image to obtain a processed image comprises:

stitching any one edge of the processed vehicle image and one edge of the processed vehicle window area image to obtain the processed image; or, replacing the vehicle window portion in the processed vehicle image with the processed vehicle window area image to obtain the processed image.

16. The vehicle monitoring apparatus of claim 15, wherein, after performing feature identification on the vehicle window area image to obtain an identification result of a target feature, the processor is configured to execute programs corresponding to the executable program codes by reading the executable program codes stored in the memory to further perform:

saving image parameters of the identified pre-processed image, wherein, the image parameters comprise: a contrast ratio of the foreground and the background of the pre-processed image and/or a grayscale value of the pre-processed image;

using the identification result, confidence of the identification result and the image parameters as feedback parameters;

using the feedback parameters to adjust pre-processing parameters for the pre-processing performed on the vehicle window area image to obtain adjusted pre-processing parameters; and using the adjusted pre-processing parameters to perform pre-processing on the current vehicle window area image and/or the next vehicle window area image, wherein, the pre-processing comprises at least one of contrast enhancement, curve correction, sharpening, and noise reduction.

17. The vehicle monitoring apparatus of claim 15, wherein, performing feature identification on the vehicle window area image to obtain an identification result of a target feature comprises:

identifying a human facial feature of the driver of the vehicle in the vehicle window area image; and identifying whether there is a driving status feature in the vehicle window area image to obtain a status identification result, wherein, the driving status feature comprises at least one of a feature indicating that the driver is making a phone call, a feature indicating that the sun-shading board of the vehicle is unfolded, and a feature indicating that the driver is wearing the seatbelt, wherein, the identification result comprises the human facial feature of the driver and the status identification result.

18. The vehicle monitoring apparatus of claim 15, wherein, performing human eye sensory processing on the vehicle image and the vehicle window area image respectively comprises:

performing highlight and/or shadow adjustment on the vehicle image to obtain the processed vehicle image; and adjusting the contrast coefficient of each pixel point in the vehicle window area image to obtain the processed vehicle window area image.

\* \* \* \* \*